May 27, 1941.　　　G. P. DESPRET　　　2,243,149
METHOD AND APPARATUS FOR THE MANUFACTURE OF HARDENED GLASS
Filed Feb. 10, 1936　　　4 Sheets-Sheet 1
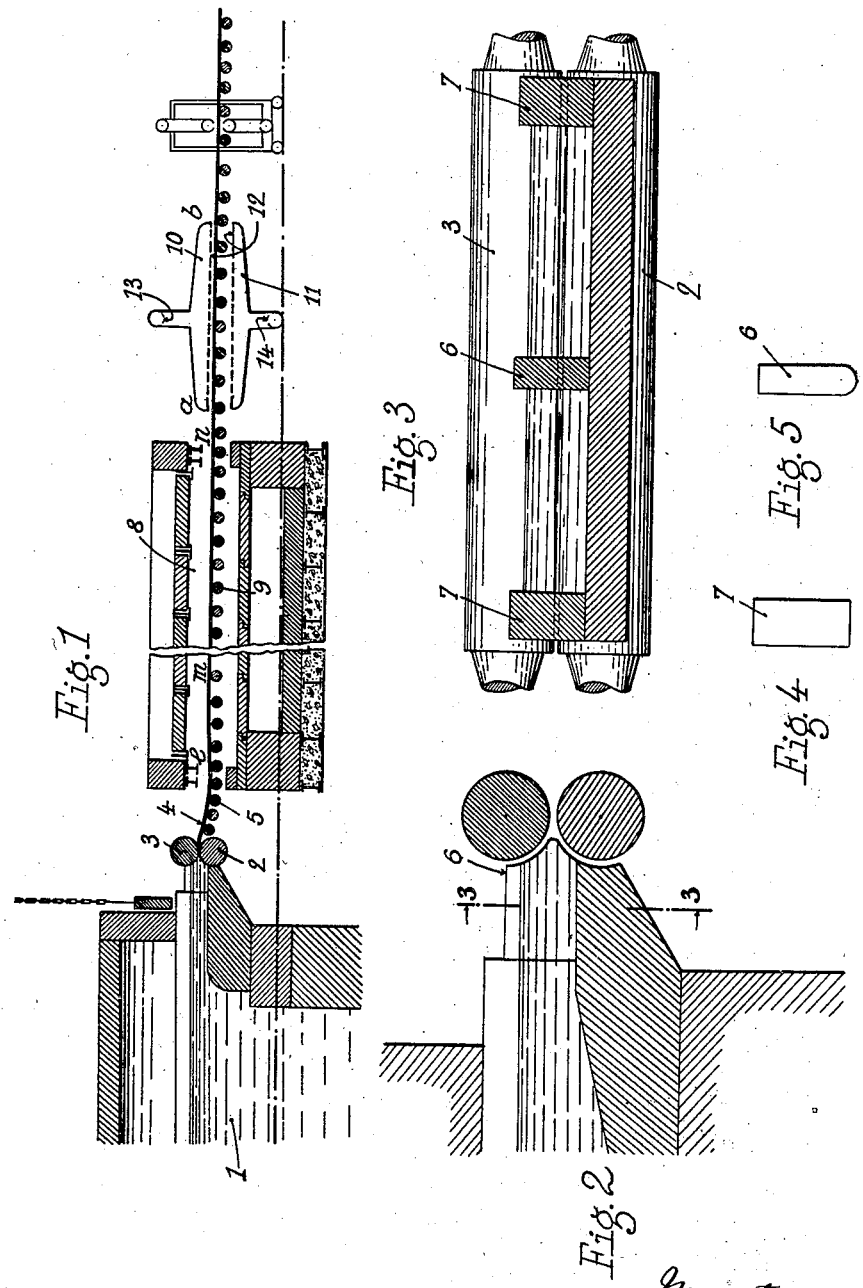

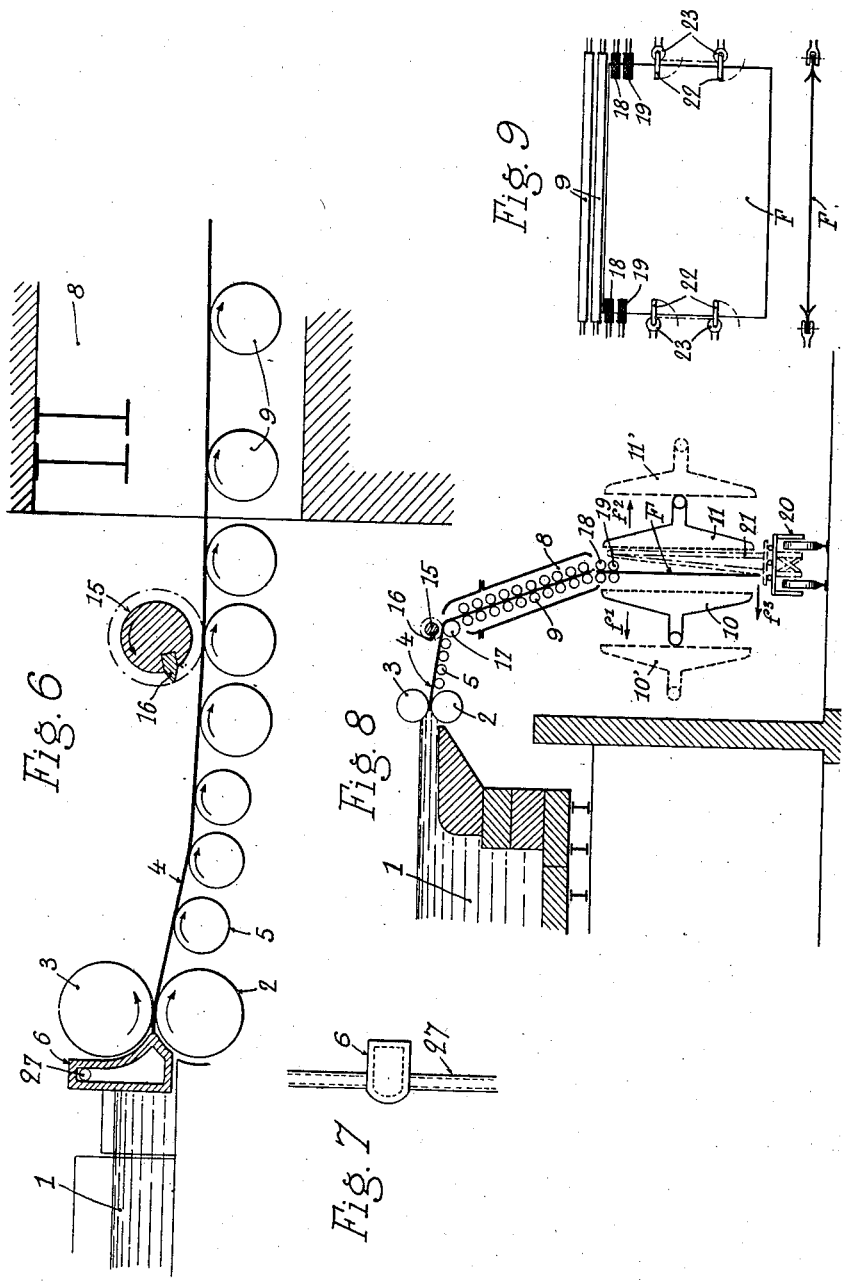

May 27, 1941.  G. P. DESPRET  2,243,149
METHOD AND APPARATUS FOR THE MANUFACTURE OF HARDENED GLASS
Filed Feb. 10, 1936  4 Sheets-Sheet 3

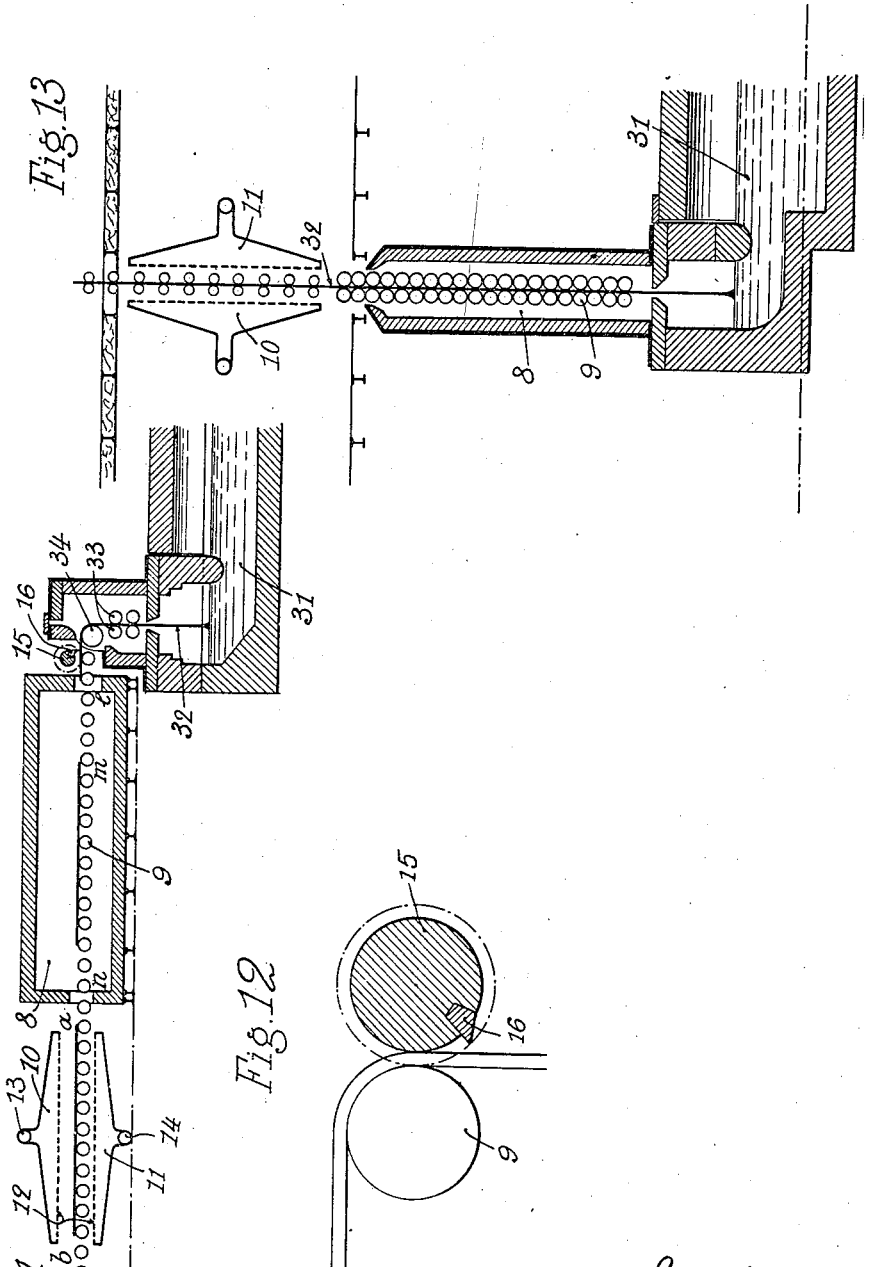

Patented May 27, 1941

2,243,149

UNITED STATES PATENT OFFICE 2,243,149

METHOD AND APPARATUS FOR THE MANUFACTURE OF HARDENED GLASS

Georges Paul Despret, Paris, France, assignor to The American Securit Company, Wilmington, Del.

Application February 10, 1936, Serial No. 63,241
In France February 11, 1935

4 Claims. (Cl. 49—3)

Methods of an essentially intermittent nature for hardening glass sheets or glass plates are already known, in which the said sheets or plates, which have been preliminarily cast and annealed by known methods and have been optionally subjected to a finishing process by which they are given the desired polish, are then subjected to a final process of hardening, during which the glass sheets or plates are first brought to a temperature near the softening temperature, and are then suddenly and energetically cooled.

Methods are also known for the continuous manufacture of drawn glass sheets or plates, in which a band of glass is drawn, either vertically or otherwise, from a sheet or a bath of glass, while proceeding between members of suitable form by which its width is maintained constant. The band is then annealed in conduits or furnaces which may be vertical, horizontal, or inclined in any plane, and it is subsequently cut up into sheets of the required dimensions. The said sheets or plates are sold either in this form, or after they have been subjected to a thermic treatment (for hardening) which confers upon them the characteristic properties of hardened glass.

The successive treatments above mentioned are of a most expensive nature, and thus the price of the resulting product is too high to allow its use for certain purposes, and in particular for construction, chiefly for ordinary glazed work or for roofs, or as ornamental glass, or for like purposes.

The present invention relates to a new method for the manufacture of hardened glass sheets or glass plates, starting either, with crude rolled glass or with crude drawn glass. Such hardened glass, either clear or colored, and optionally in relief, is chiefly adapted for ordinary glazed work, for roofs, or for ornamental purposes (opal glass or marbled glass). The present method affords, in a simple and economical manner, the well-known advantages of the hardening process, such as a considerable hardening, an increase of resistance to heat and to breakage, a fragmentation, in case of breakage, into a great number of small pieces which are not of a cutting nature, and the like.

The said economical method is chiefly characterized by the fact that it consists essentially in the hardening of the glass band, which is optionally continuous immediately after or a short time after the rolling process or the drawing process, in such way that the glass will remain at a sufficiently high heat in order that it may be subjected to the hardening process without reheating, or that it will be at least at a temperature which is maintained to a sufficient degree for the hardening.

Before the hardening process, the glass may optionally proceed into a chamber in which the temperature is made uniform.

The rolled or drawn band may be cut into sections, either after the hardening process by the use of suitable means, or before the said process, and in this latter case, if the plant comprises a chamber adapted for uniform temperature, before or after it proceeds into this chamber.

The invention has further for its object, as new manufactured products, the sections of glass sheets or glass plates which are obtained by rolling or by drawing and hardened by the aforesaid method.

The invention also relates to a plant by which the said method is carried into effect.

In the accompanying drawings, which are given solely by way of example:

Fig. 1 is a diagrammatic view of a rolling and hardening plant according to the invention.

Fig. 2 is a transverse vertical section, on a larger scale, of a rolling device comprising projecting parts by which the glass band may be separated longitudinally into a certain number of unit bands which proceed in the adjacent position throughout the entire plant.

Fig. 3 is a vertical section on the line 3—3 of Figure 2.

Figs. 4 and 5 are plan views of one of the lateral dam walls and of the axial projection.

Fig. 6 is a longitudinal section of a portion of the plant comprising the cutting device, which is located on that side of the chamber adapted to maintain a uniform temperature, through which the glass is introduced.

Fig. 7 is a plan view of one of the projections employed in the plant shown in Fig. 6.

Fig. 8 is a vertical section of a modified form of the rolling and hardening plant.

Fig. 9 is a corresponding partial front view.

Fig. 11 is a diagrammatic view of a drawing and hardening plant according to the invention.

Fig. 12 is a partial view, on a larger scale, of a device for cutting up the glass band.

Fig. 13 is a modification of Fig. 11.

Figure 10:
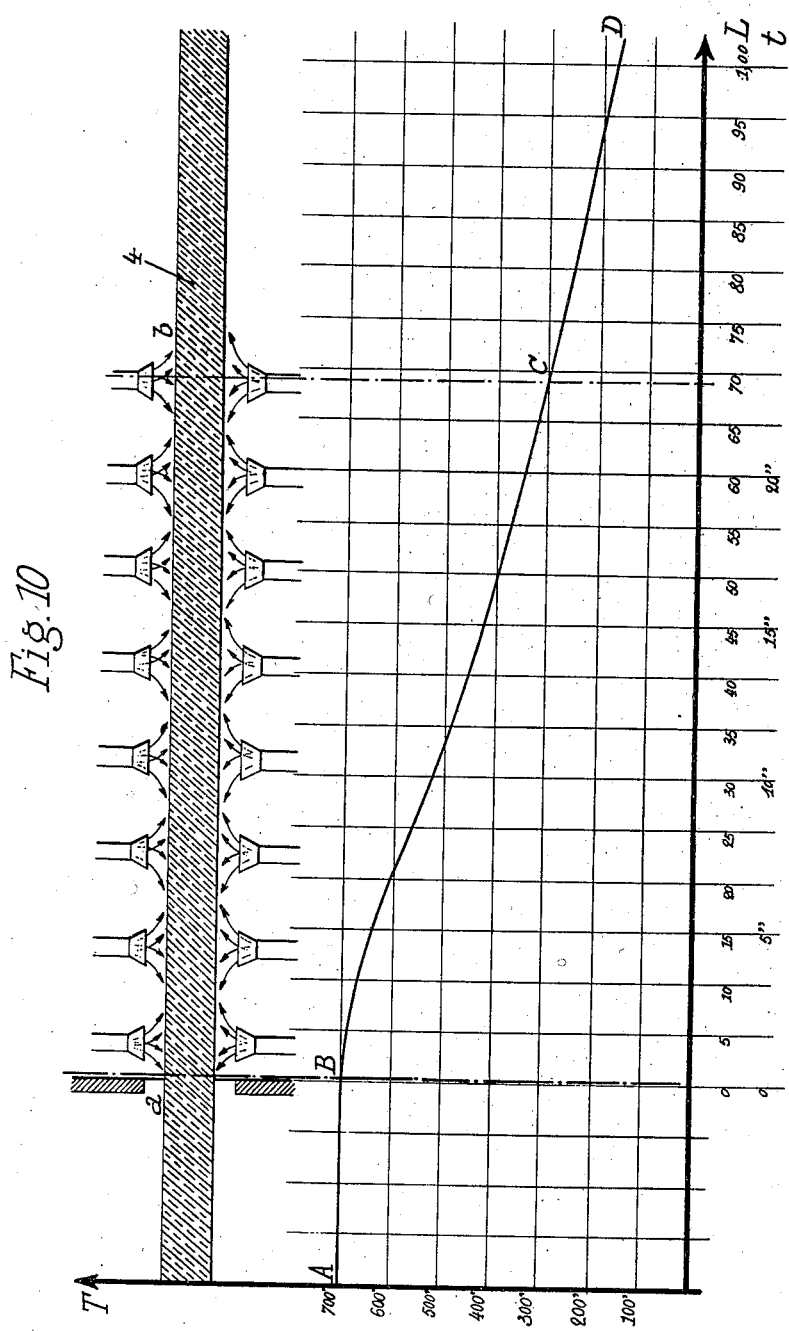
Fig. 10 is a curve showing the gradual action of the hardening process, in the case in which the glass band is cut off only after the hardening process.

When the glass band is obtained by the rolling process, the glass which is melted for instance in a basin furnace 1 (Figure 1) proceeds between two rollers 2—3 adapted for rolling or embossing, by which it assumes the form of a band of glass 4, moving forward upon transporting rollers 5.

The glass band 4 may be delivered by the rollers 2—3 in the form of a single band of the desired width, or of several bands having equal or unequal widths. Such unit bands may be produced in a known manner by placing immediately before the rollers 2—3, suitable members or projections 6 (Figs. 2-3-5) made of a refractory material or of metal, optionally cooled, the position of which can be adjusted by any suitable means, not shown. The number of projections 6 will depend upon the length of the rolling device, and also, for a given rate of rolling, upon the feed from the furnace. Such members 6 are held in position, in the same way as the lateral dam walls 7 (Figs. 3 and 4) by any suitable means by which they may receive a vertical pressure. For instance, the cooled metal projections 6 are held in the proper position by the pipes 27 (Figs. 6 and 7) used for the feed and the discharge of water, which are mounted in frames situated outside the rolling device.

The glass sheet or glass plate 4, which consists of a single band or of several juxtaposed bands (hereinafter, only a single band will be considered) will thus move forward upon the rollers 5.

When the glass band is obtained by the drawing process, the glass which is melted in a basin furnace 31 (Fig. 11) is drawn out, by any known process, in the form of a band 32 which is drawn upwardly, for instance in a vertical plane, by drawing rollers 33.

In the example represented in Figure 11, the band 32 passes over a supporting roller 34, and then moves horizontally.

The band 4 or 32 of rolled or drawn glass (or the sheets obtained by cutting up this band) enters almost at once into a chamber 8, in which the temperature of the glass travelling upon rollers 9 is made uniform (Figs. 1 and 11). This chamber is heated by electric or other means. The glass band is maintained or kept in the said chamber at a temperature suitable for the hardening.

When the glass issues from the chamber 8 in which the uniform temperature is obtained, it proceeds into a cooling apparatus of a known type.

The said cooling apparatus (Figs. 1 and 11) may be provided with an upper box 10 and a lower box 11, between which the glass to be hardened is circulated. The boxes 10 and 11 are provided, on their adjacent sides, with apertures 12 for the outlet of the cooling fluid, such as air, steam or the like, and the boxes are supplied with fluid through the feeding conduits 13—14.

It is evident that each box may be replaced by a grating which consists of perforated tubes. Such boxes or gratings may be fixed or movable, and may have a rotary or a reciprocating motion.

The cooling fluid may be supplied through the rollers themselves, and in this case the rollers will be made hollow, with suitable perforations, and will be connected to the fluid supply.

The cooling device may not only operate with a fluid which is projected upon the glass, but it may also withdraw the fluid surrounding the glass, and further, suitable means may be provided for the combined injection and withdrawal of the fluid.

As above stated, the glass band 4 or 32 may be cut up into suitable sections of the required size, either after or before the hardening process.

The glass ribbon may be cut after the rapid chilling and consequent hardening by the use of gas burners 35 disposed oppositely above and below the ribbon as shown in Figure 1. These burners may be mounted upon a movable carriage 36 for adjustment or transportation of the burners.

In the first case (cutting after hardening), the glass band 4 proceeds at a constant rate into the cooling device, and the temperature of the glass will gradually decrease from the inlet at $a$ (Fig. 10) to the outlet at $b$ of the said device. The curve A B C D, which shows the temperatures T as ordinates depending upon the lengths L or upon the time $$t=\frac{L}{v}$$

($v$ being the speed of the band), which are indicated as abscissae, indicates by way of example the gradual decrease of the temperature of the glass. Owing to this gradual action, and to the fact that the cooling shall be uniform throughout the whole width of the band, there will be no danger of any rupture between the moment at which the hot or even pasty glass enters at $a$ into the hardening device and the moment at which the glass in the hardened and cooled state will leave this device at $b$.

It is shown by experience that in the hardening process in conformity with the invention, the hardening process, for glass of 5 to 10 mm. thickness, is practically finished at temperatures of about 350° to 300° C. (point C), and that the glass after it has been hardened by a sudden cooling to such temperatures, may then be allowed to remain in the air of the room, without any danger of breaking, until it becomes completely cooled.

On completion of the hardening process, the glass band is cut up into lengths, for example by the blowpipe or by an electrically heated device, thus bringing a very narrow region of the glass to the melting point, or by any other process.

In the second case (cutting before hardening) the band or the juxtaposed bands having the usual widths are cut into the required lengths by a cutting device, which is mounted forwardly of the tempering device and either before (Figure 6 or 11) or after the chamber 8 adapted to produce a uniform temperature, if such chamber is employed. In this case, the cutting device may have any desired construction, and may comprise a roller 15 (Figs. 6, 11 and 12) which carries a knife blade 16. The said roller is automatically set in rotation at the proper time, i. e. when a given length of the glass band has passed through. Due to the rotation of the roller 15 at the determined speed, the blade 16 will enter the soft glass, and will thus cut off the band.

After the cutting operation, the roller 15 is at once automatically stopped, in a known manner, and it then resumes its original position. It is obvious that any other suitable device for cutting the hot glass may be employed, for instance a sliding drop-knife device, which will return to its upper position after the cutting operation.

The cutting of the band before hardening may also be advantageously effected by a device which is heated electrically or by the blowpipe, and which will bring a narrow region of the glass band into the softened state required for the cutting, and advantage will be obviously taken of the heat already possessed by the glass band which enters in the pasty state.

In all these various arrangements for the cutting of the glass before it is hardened, the final cutting of the band may be facilitated by an increase of the speed of the rollers which come after the place of cutting.

The sections of glass sheets or plates, which are thus obtained are introduced into the chamber 8, if as shown in Figs. 6 and 11, the cutting device is located before the inlet side of said chamber. In the said chamber, the glass sections assume a uniform temperature. They leave this chamber at a high speed or otherwise, by the action of rollers 9 by which they are brought to the hardening device. The high speed is obtained by increasing the rate of rotation of the transporting rollers in the part $mn$ (Figs. 1 and 11) of the chamber 8, for instance by means of a known electromagnetic clutch which provides for a difference between the speeds of the rollers in the two parts $lm$ and $mn$ of the chamber 8.

The glass sections supplied to the cooling device 10—11 may be stopped in this device, which is possible by reason of the advance given to them, or they may continue to move forward, at a reduced speed or otherwise, during the hardening treatment.

The sections of glass sheets or plates leave the hardening device in the cut and finished state, and are then ready to be stocked or packed.

In the preceding constructions, the entire line of movement of the glass band or bands, or of the sections, is horizontal, but it is obvious that any other line of movement may be utilized. In particular, the glass sections may be brought to the blowing device 10—11 according to an inclined plane or other plane, and for instance a vertical plane, with a rising or descending movement.

Figs. 8 and 9 show by way of example a modification in which the glass band, after the rolling process, is bent upon a bending roller 17 and then descends obliquely to the chamber 8 adapted to produce a uniform temperature.

The cutting device consisting of the roller 15 and the blade 16, for example, is preferably situated adjacent the bending roller 17.

The rollers 9 located in the chamber 8 can be given two different speeds, a slow speed corresponding to the rate of forward motion of the glass band which has not yet been cut, and a higher speed which provides for the rapid discharge of the glass after the cutting operation.

The boxes 10—11 of the hardening device are mounted in the vertical position below chamber 8, and said boxes are preferably located in such manner that they will move apart into the positions 10'—11' according to the arrows $f^1$ and $f^2$, in order to facilitate the removal of the sections after the hardening process.

During the hardening process, the glass section F remains in the suspended position by means of the milled rollers or wheels 18—19, which may be rotated if desired. These latter will grip the glass band either upon its whole width, or only upon its vertical edges.

The glass band is received, immediately after the hardening operation, upon a truck 20 which moves forward as soon as the boxes 10—11, or like devices, have been moved apart when the hardening operation is finished. When the truck 20 has been loaded with the glass band, it moves out in order to allow the boxes 10—11 to resume the operating position.

The truck 20 preferably consists of two principal parts. The upper part or support 21 is movable, according to the arrow $f^3$ (Fig. 8), upon the lower part, in order that the glass band may be put in place with greater facility.

In order to prevent the oscillation of the said band during the hardening operation, the apparatus is preferably provided with suitable guides, such as forks 22 (Fig. 9) made of an adequate material and secured, for instance, to one of the boxes of the blowing device. When the boxes are separated, the said forks will move aside by pivoting on an axle 23. They are again brought into the guiding position when the boxes 10—11 return to the blowing position.

Any other means for receiving the glass bands F may be used. For instance, the bands may be simply removed by the workmen, who seize the band when the blowing boxes have been separated, and they carry it off when it has been released from the milled wheels 18—19.

In the modification represented in Fig. 13, the band of drawn glass 32 continues its vertical motion and proceeds, before the cutting operation, into the chamber 8, and then into the hardening apparatus 10—11. The cutting operation takes place at the end of the process.

Obviously, the invention is not limited to the forms of construction herein described and represented, which are given solely by way of example.

Any suitable devices for transporting the glass band may be utilized, such as chains, endless belts, or the like.

In the appended claims "glass sheets" is a generic term covering as well glass sheets as glass plates.

Having now described my invention what I claim as new and desire to secure by Letters Patent is:

1. In apparatus for the manufacture of hardened glass sheets, the combination of a melting tank, means for withdrawing and forming from said melting tank a continuous ribbon of glass in sheet form, means for case-hardening or tempering said ribbon of glass, so constructed and arranged to rapidly chill the glass before its temperature is reduced to a point substantially below its softening point, and means for cutting said case-hardened or tempered ribbons into case-hardened or tempered sheets.

2. A method for the manufacture of hardened glass sheets, which consists in establishing a supply body of molten glass, withdrawing from said supply body a continuous ribbon of plastic glass, moving the continuous ribbon while at a temperature substantially approximating its softening point through a zone in which the glass is rapidly chilled to harden the same and then cutting said continuous hardened ribbon into sheets.

3. A method for the manufacture of hardened glass sheets, which consists in establishing a supply body of molten glass, withdrawing from said supply body a continuous strip of glass, moving the strip through a temperature control zone to maintain the glass at approximately the softening point, chilling the glass rapidly upon leaving said zone and then cutting the glass strip into sheets.

4. In apparatus for the manufacture of hardened glass sheets, the combination of a melting tank, means for withdrawing and forming from said melting tank a continuous ribbon of glass in sheet form, means for case-hardening or tempering said ribbon of glass so constructed and arranged to rapidly chill the glass before its temperature is reduced to a point substantially below its softening point, and gas burners for cutting said case-hardened or tempered glass ribbon into case-hardened or tempered glass sheets.

GEORGES PAUL DESPRET.